United States Patent
Pan

(10) Patent No.: US 7,816,973 B2
(45) Date of Patent: Oct. 19, 2010

(54) DEVICES AND METHODS FOR REDUCING EFFECTS OF DEVICE MISMATCH IN TEMPERATURE SENSOR CIRCUITS

(75) Inventor: Dong Pan, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 437 days.

(21) Appl. No.: 11/986,334

(22) Filed: Nov. 20, 2007

(65) Prior Publication Data

US 2009/0129438 A1 May 21, 2009

(51) Int. Cl.
*H01L 37/00* (2006.01)
(52) U.S. Cl. .................. 327/513; 327/539; 327/512
(58) Field of Classification Search ............. 327/512, 327/513, 539
See application file for complete search history.

(56) References Cited

U.S. PATENT DOCUMENTS

| | | | | |
|---|---|---|---|---|
| 5,696,710 | A * | 12/1997 | Hague et al. | 708/551 |
| 6,008,685 | A * | 12/1999 | Kunst | 327/512 |
| 6,833,751 | B1 * | 12/2004 | Atrash | 327/534 |
| 6,876,250 | B2 * | 4/2005 | Hsu et al. | 327/539 |
| 6,954,059 | B1 * | 10/2005 | MacLean | 323/316 |
| 7,116,129 | B2 | 10/2006 | Pan et al. | 326/32 |
| 7,127,368 | B2 * | 10/2006 | Choi | 702/130 |
| 7,309,157 | B1 * | 12/2007 | Aslan et al. | 374/178 |
| 7,609,195 | B2 * | 10/2009 | Jeong | 341/164 |
| 7,683,701 | B2 * | 3/2010 | Georgescu et al. | 327/539 |
| 2005/0062491 | A1 * | 3/2005 | Burns et al. | 324/763 |
| 2006/0190210 | A1 | 8/2006 | Mukherjee | 702/130 |
| 2007/0252573 | A1 * | 11/2007 | Tachibana et al. | 323/313 |
| 2008/0061864 | A1 * | 3/2008 | Oberhuber | 327/512 |
| 2009/0238239 | A1 * | 9/2009 | Pan | 374/178 |

* cited by examiner

*Primary Examiner*—Lincoln Donovan
*Assistant Examiner*—Thomas J Hiltunen
(74) *Attorney, Agent, or Firm*—Dorsey & Whitney LLP

(57) ABSTRACT

A temperature sensor having one or more mirror circuits output temperature dependent output signals is disclosed in one embodiment. The temperature sensor includes a sampling circuit coupled to receive a clock signal that samples the output signals for a duration of a predetermined number of clock cycles. The temperature sensor additionally includes a phase control circuit that receives the clock signal and generates a control signal that enables subsequent sampling operations. Each subsequent sampling operation has a duration of the predetermined number of clock cycles. The control signal from the phase control circuit further enables input and output terminals of respective circuit components in the mirror circuits to be switched for each subsequent sampling operation.

18 Claims, 7 Drawing Sheets

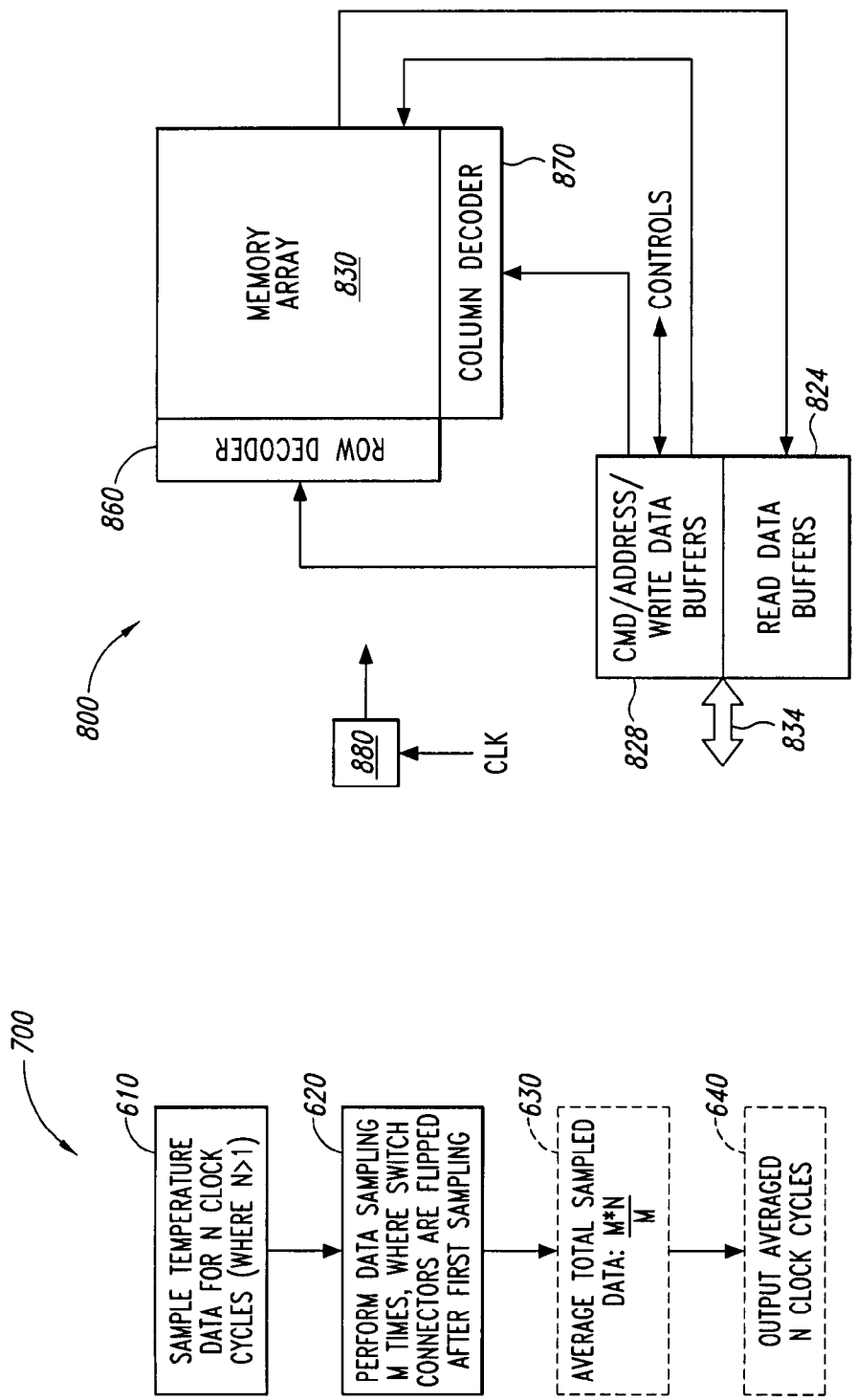

DEVICES AND METHODS FOR REDUCING EFFECTS OF DEVICE MISMATCH IN TEMPERATURE SENSOR CIRCUITS

TECHNICAL FIELD

Embodiments of the present invention relate generally to integrated circuits, and more specifically to reducing device mismatch in integrated circuits such as a digital temperature sensor.

BACKGROUND

Integrated circuits are commonly used in electronic devices to perform a variety of device operations, and are typically operated by a clock. Examples of integrated circuits include dynamic random access memory (DRAM), synchronous dynamic random access memory (SDRAM) and other types of memory devices that may also include non-volatile memory devices. Integrated circuits, such as DRAM memory, are increasingly operated at faster clock speeds, which consequently increases power dissipation and temperature. Therefore, temperature sensors may be utilized, for example by a memory controller, to regulate the temperature of the device and improve memory performance at the higher temperatures. Examples of temperature sensors include a digital temperature sensor on chip with a continuous temperature readout capability. Temperature sensors, such as digital temperature sensors, are typically small so that the die size is not adversely affected, usually requires low power to operate, and are generally reliable without requiring frequent calibration, which minimizes test time overhead.

An example of a prior art digital temperature sensor 100 is shown in FIG. 1. The temperature sensor 100 utilizes a pair of diodes 16, 18 as the basic sensing element. The forward voltage drop across the diodes 16, 18 decreases linearly with temperature increasing. A current that is proportional to absolute temperature is generated ($I_{PTAT}$) across a resistor 20 responsive to the diode 18 detecting the temperature. The PTAT voltage at node 21 is matched complementary to the diode voltage at node 23 and are provided as inputs to the amplifier 14 to subsequently enable the transistors 12a-c such that $I_{PTAT}$ may be appropriately sourced and adjusted through the diode 18. Similarly, a current that is complementary to absolute temperature ($I_{CTAT}$) is generated through transistors 22a,b to cause the current $I_{CTAT}$ to flow through a resistor 26. Transistors 22a,b are enabled by another amplifier 24 that receives complementary input signals at node 23 and node 27, to adjust $I_{CTAT}$ responsive to changes to temperature. The $I_{PTAT}$ may be mirrored by the transistor 12c through a node 40 to charge a capacitor 32, or alternatively the $I_{CTAT}$ may be mirrored by transistors 28a,b to discharge the capacitor 32.

In operation, the capacitor 32, as it is being charged or discharged by either the $I_{PTAT}$ or $I_{CTAT}$, is utilized to sample each of the currents responsive to the temperature being detected by the diodes 16, 18. A comparator (not shown) samples the voltage of the capacitor 32 and makes a decision and provides a digital output once every clock cycle relative to a clock signal being received. The capacitor 32 is sampled for "N" number of clock cycles, and the number of counts the comparator output is HIGH is recorded for the "N" number of clock cycles. The number of digital counts is then compared to a reference value that is used to determine a temperature readout.

A problem with the temperature sensor 100 is that there are a number of components in the circuitry that may be affected by device mismatch, which can negatively affect the accuracy of the temperature readouts. For example, the transistors 12a-c in block 11 should ideally be the same and have the same operating parameters to accurately generate the PTAT current proportional to temperature changes. However, as is well-known in the art, actual transistor components that are manufactured to be the same do not typically have exactly the same operating parameters. Device mismatch can also affect several other components in the temperature sensor circuit 100, such as amplifiers 14, 24. Ideally, the differential inputs to the amplifiers 14, 24 are matched and do not have any voltage or current offset so that the output signal can properly enable the corresponding transistors 12, 22. Even slight offsets in the amplifiers 14, 24 will affect how the respective $I_{PTAT}$ and $I_{CTAT}$ are sourced through the transistors 12, 22. Further mismatch may exist between transistors 22a,b, 28a,b in blocks 61, which will also create offsets that may affect the magnitude of $I_{PTAT}$ or $I_{CTAT}$ and adversely impact the accuracy of the temperature readout.

Conventional mismatch reduction techniques include utilizing a chopping amplifier or an auto-zero circuit. A chopping amplifier operates by switching the connections to the input terminals in synchronicity with switching of the connections to the output terminals in response to a clock signal. The switching results in cancellation of any voltage or current offset of the amplifier. Chopping amplifiers can be applied to the amplifiers 14, 24. A drawback to the chopping amplifier, however, is that the amplifier requires "settling time" to stabilize after each switching, which limits the operating speed of the temperature sensor 100. An auto-zero circuit utilizes a capacitor coupled to one of the inputs of the amplifiers 14, 24 to "store" the offset voltage which is used to provide an equal voltage offset and match the inputs. However, the auto-zero circuit typically requires a large capacitor to store the offset voltage, which can significantly increase the overall circuit layout area. Furthermore, both the chopping amplifier and the auto-zero circuit only improves performance of amplifiers 14, 24, and does not reduce effects of device mismatch of transistor components in blocks 11, 61.

There is, therefore, a need for a digital temperature sensor that is less susceptible to the adverse effects of device mismatch in the circuitry.

BRIEF DESCRIPTION OF THE DRAWINGS

FIG. 7 is a flow diagram of the operation of the mismatch reduction method according an embodiment.

FIG. 8 is a functional block diagram illustrating a memory device that includes the sense amplifier according to an embodiment.

DETAILED DESCRIPTION

Certain details are set forth below to provide a sufficient understanding of embodiments of the invention. However, it will be clear to one skilled in the art that embodiments of the invention may be practiced without these particular details. Moreover, the particular embodiments of the present invention described herein are provided by way of example and should not be used to limit the scope of the invention to these particular embodiments. In other instances, well-known circuits, control signals, and timing protocols have not been shown in detail in order to avoid unnecessarily obscuring the invention.

Figure 2:
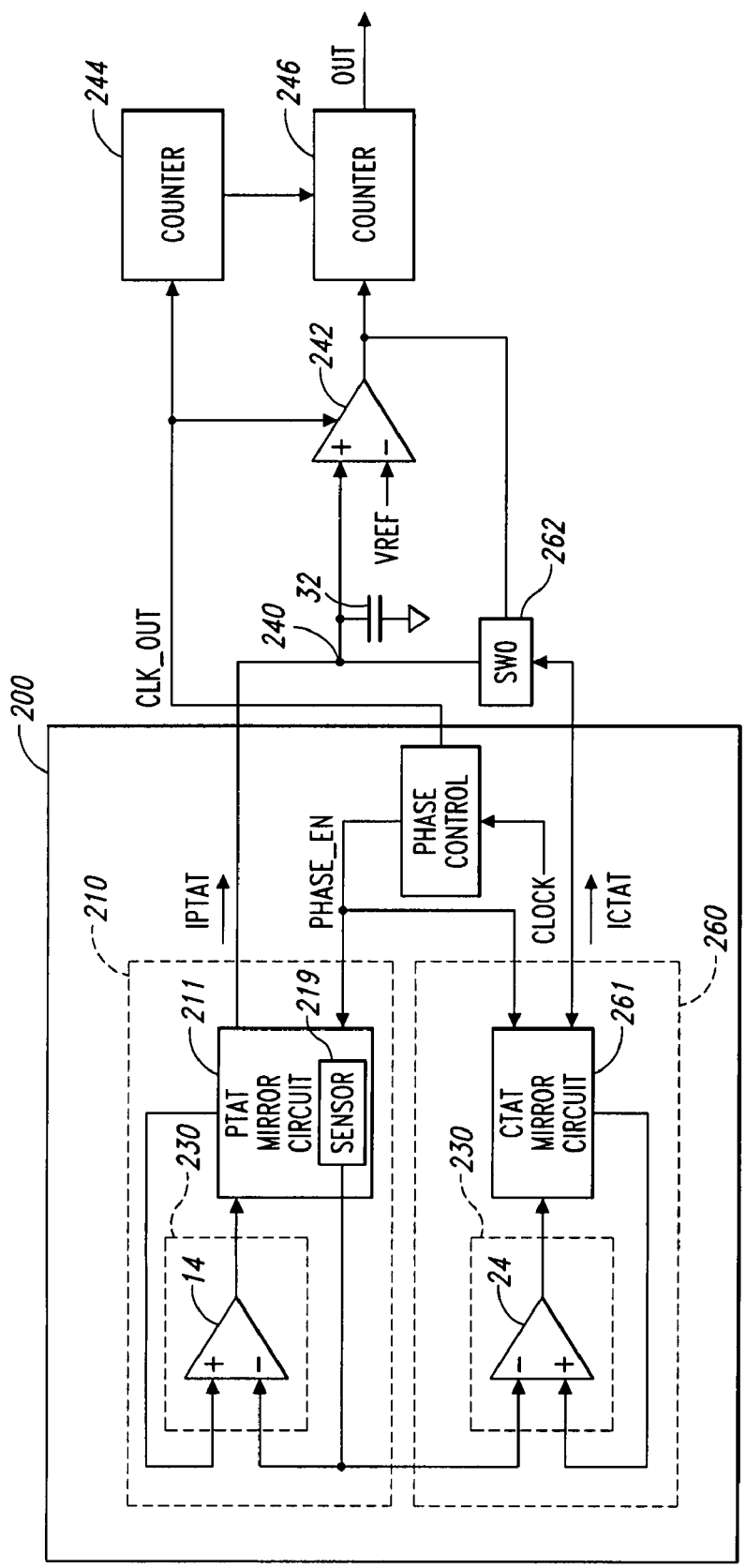
FIG. 2 is a block diagram of a digital temperature sensor circuit according to an embodiment of the invention.

FIG. 2 shows a block diagram of a digital temperature sensor 200 according to an embodiment of the invention. The temperature sensor 200 includes a temperature dependent current generator block 210 that generates a current proportional to absolute temperature (PTAT) and a second temperature dependent current generator block 260 that generates a current complementary to absolute temperature (CTAT). The current generator block 210 includes a differential amplifier circuit 14 for driving a current through a PTAT mirror circuit 211 responsive to a sensor device 219 that detects changes in temperature. The amplifier 14 receives a detection signal from the sensor device 219 and a feedback signal from the PTAT mirror circuit 211, that drives the temperature dependent $I_{PTAT}$ current through the PTAT mirror circuit 219. Similarly, the current generator block 260 includes a differential amplifier 24 that drives a temperature dependent current $I_{CTAT}$ through a CTAT mirror circuit 261 responsive to a feedback signal and the detection signal from the sensor device 219.

The $I_{PTAT}$ current is provided to a node 240 coupled to a capacitor 32 that may be charged by the $I_{PTAT}$ current. The $I_{CTAT}$ current is also provided to the node 240 through a switch 262, and when the switch 262 is enabled the $I_{CTAT}$ current discharges the capacitor 32. The capacitor 32 may be coupled to a comparator 242 that samples either the $I_{PTAT}$ or $I_{CTAT}$ currents, as the capacitor 32 is charged or discharged, in response to a clock signal CLK_OUT from a phase control circuit 265. The phase control circuit 265 additionally provides the CLK_OUT signal to a counter 244 that keeps track of a number of clock cycles N. The counter 244 may be predetermined or preprogrammed, for example, by an external controller (not shown). The results of the comparator 242 may be additionally tracked by a counter 246.

In operation, the temperature detected by the sensor device 219 is sampled as the $I_{PTAT}$ and the $I_{CTAT}$ charges and discharges the capacitor 32 at node 240. The current $I_{PTAT}$ initially charges the capacitor 32. When the voltage across the capacitor 32 exceeds a value $V_{REF}$, the comparator 242 transitions HIGH and enables the switch 262, sinking the current $I_{CTAT}$ to discharge the capacitor 32 at node 240. As the voltage across the capacitor 32 decreases below $V_{REF}$, the switch 262 is again disabled to allow the $I_{PTAT}$ to charge the capacitor 32 once again, and so on. The comparator 242 makes a decision to output a digital signal once every clock cycle relative to a clock signal CLK_OUT that may be provided by the phase control circuit 265. The phase control circuit 265 may either receive an external clock signal CLOCK or may contain an internal oscillator (not shown) to generate the CLOCK_OUT signal. Thus the voltage of the capacitor 32 is sampled for "N" clock cycles and the number of times the comparator 242 outputs a HIGH signal over N clock cycles is recorded by the counter 246. The number of counts, represented by the signal OUT from the counter 246, may subsequently be compared to a reference count to convert the digital counts OUT to a temperature readout value.

As previously discussed, the accuracy of a temperature sensor is affected by how well components in the circuitry are matched. In particular, the degree to which transistors in the mirror circuits and in the amplifiers are matched affects the reliability of the temperature readings reflected in the $I_{PTAT}$ and $I_{CTAT}$ signals. As will be described in more detail below, the temperature sensor 200 includes switching circuits used in the circuitry to switch between various configurations specifically designed to cancel offsets due to mismatched components as will be further explained. The switching circuits are responsive to control signals generated by the phase control circuit 265. The control signals are shown collectively as PHASE_EN in FIG. 2. In one embodiment, the temperature sensor 200 takes a temperature measurement for N clock cycles while the switching circuits are in a first configuration. The switching circuits are then switched to a second configuration and the temperature sensor 200 takes a temperature measurement for another N clock cycles. The temperature data from the first and second configurations can be averaged for the two periods of N clock cycles to provide final temperature data that should account for any offset due to mismatched components.

Figure 3:
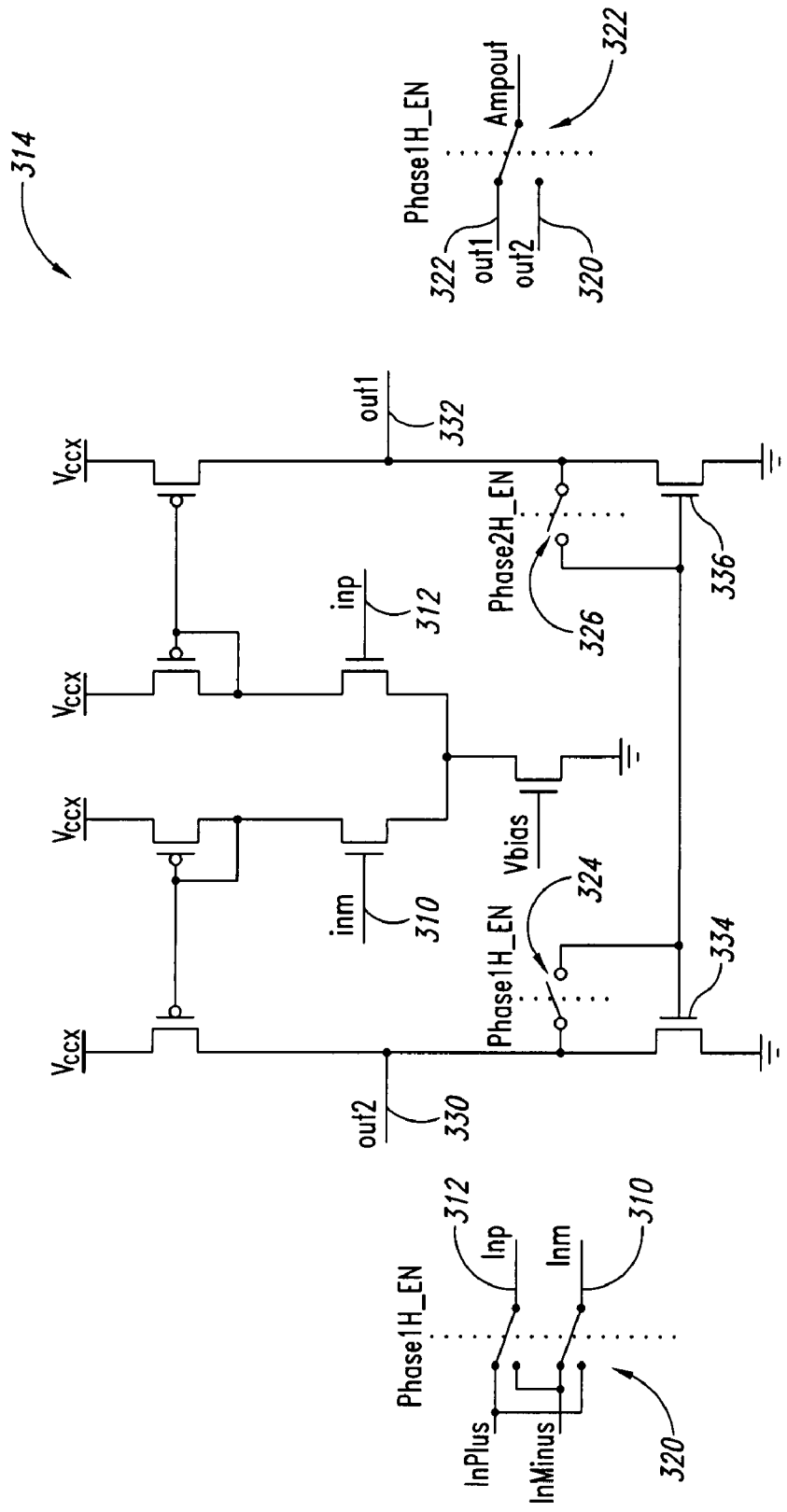
FIG. 3 is a schematic diagram an amplifier circuit having switch components according to an embodiment of the invention.

As discussed previously, the amplifiers 14, 24 in blocks 230 may have offsets due to mismatched internal circuitry. FIG. 3 shows an example of a differential amplifier 314 having a first switching circuit 320 coupled to the complementary input terminals 310, 312 and a second switching circuit 322 coupled to the complementary output terminals 330, 332. The second switching circuit 322 may provide one of two output signals as shown. Additional switching circuits 324, 326 are used to switch the coupling of NMOS transistors 334, 336, respectively. Each of the switching circuits 320, 322, 324 may be controlled by a phase enable signal PHASE1H_EN and the switching circuit 326 is controlled by a phase enable signal PHASE2H_EN provided by the phase control circuit 265. Connection of the input terminals 310, 312, the output terminals 320, 322, and transistors 334, 336 is switched by the PHASE1H_EN and PHASE2H_EN signals after N clock cycles, during which a first temperature "count" is taken by the counter 246. A second temperature count is taken over another N clock cycles with the switched configuration, which is then averaged with the first temperature count to calculate a final average temperature data. By taking the second temperature count with the switched configuration, any adverse effects due to component offset that was present in the first temperature count may be cancelled in the results of the second temperature count. Thus, the averaged final temperature data represents temperature data substantially without offsets. The switching connectors 320, 322, 324, 326 may be transistors or other types of switch devices of conventional design as known in the art.

Figure 4:
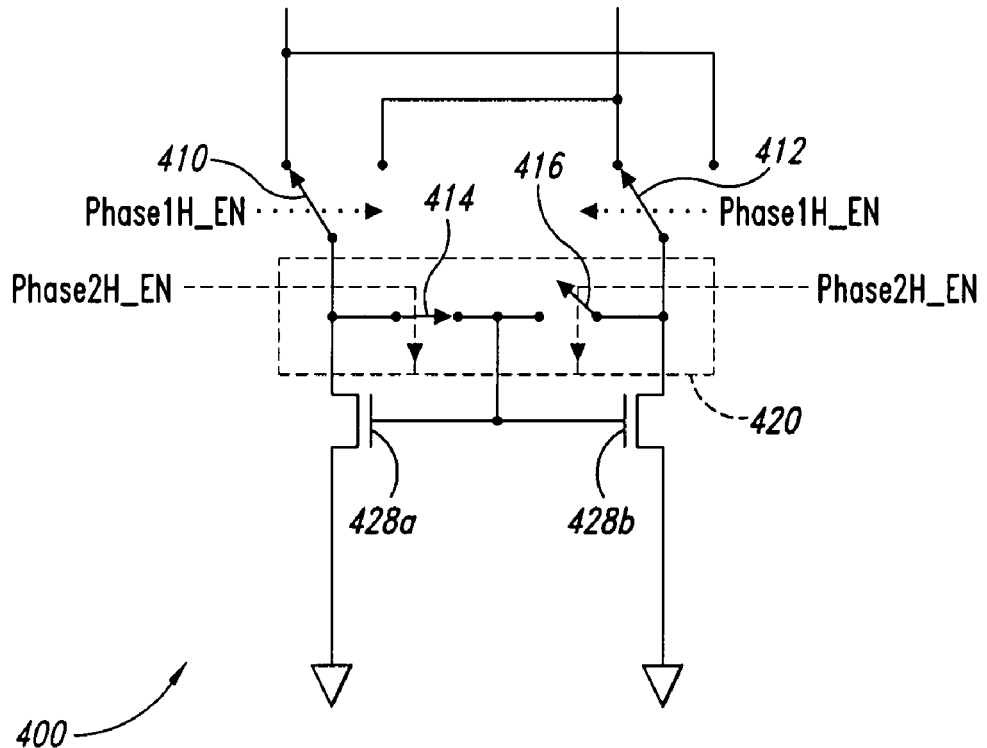
FIG. 4 is a schematic diagram of a current mirror circuit having switch components according to another embodiment of the invention.

Additional offsets due to mismatch may also occur in the temperature sensor circuit 200 where transistors are utilized and coupled in parallel. FIG. 4 illustrates a two-leg current mirror circuit 400 according to an embodiment of the invention that may be implemented for current mirror circuits 211, 261 of the temperature sensor 200. A pair of transistors 428a,b in the current mirror circuit 400 are coupled in a current mirror configuration, where the gates of the transistors 428a,b are coupled to each other and to one of its drains. The drains of each transistor 428 are also coupled to a respective switch 410, 412 that may be controlled by the PHASE1H_EN signal from the phase control circuit 265 of FIG. 2, to flip the switches 410, 412 between two nodes. The current mirror circuit 400 further includes switches 414 and 416 to alternate coupling of the drain of one of the transistors 428a,b in accordance with the PHASE1H_EN and PHASE2H_EN signals, respectively. As will be described in more detail below, the switches 410, 412 are switched between the two nodes after N clock cycles in order to obtain temperature measurements with the switches 410, 412, 414, 416 in a first configuration for N clock cycles, and then obtain temperature measurements with the switches 410, 412, 414, 416 in a second configuration for another N clock cycles (total measurement over 2N clock cycles). The measurement obtained for the first and second configurations are then averaged. As a result, offsets due to mismatched transistors 428a,b may be canceled out by averaging to calculate a final result.

Figure 1:
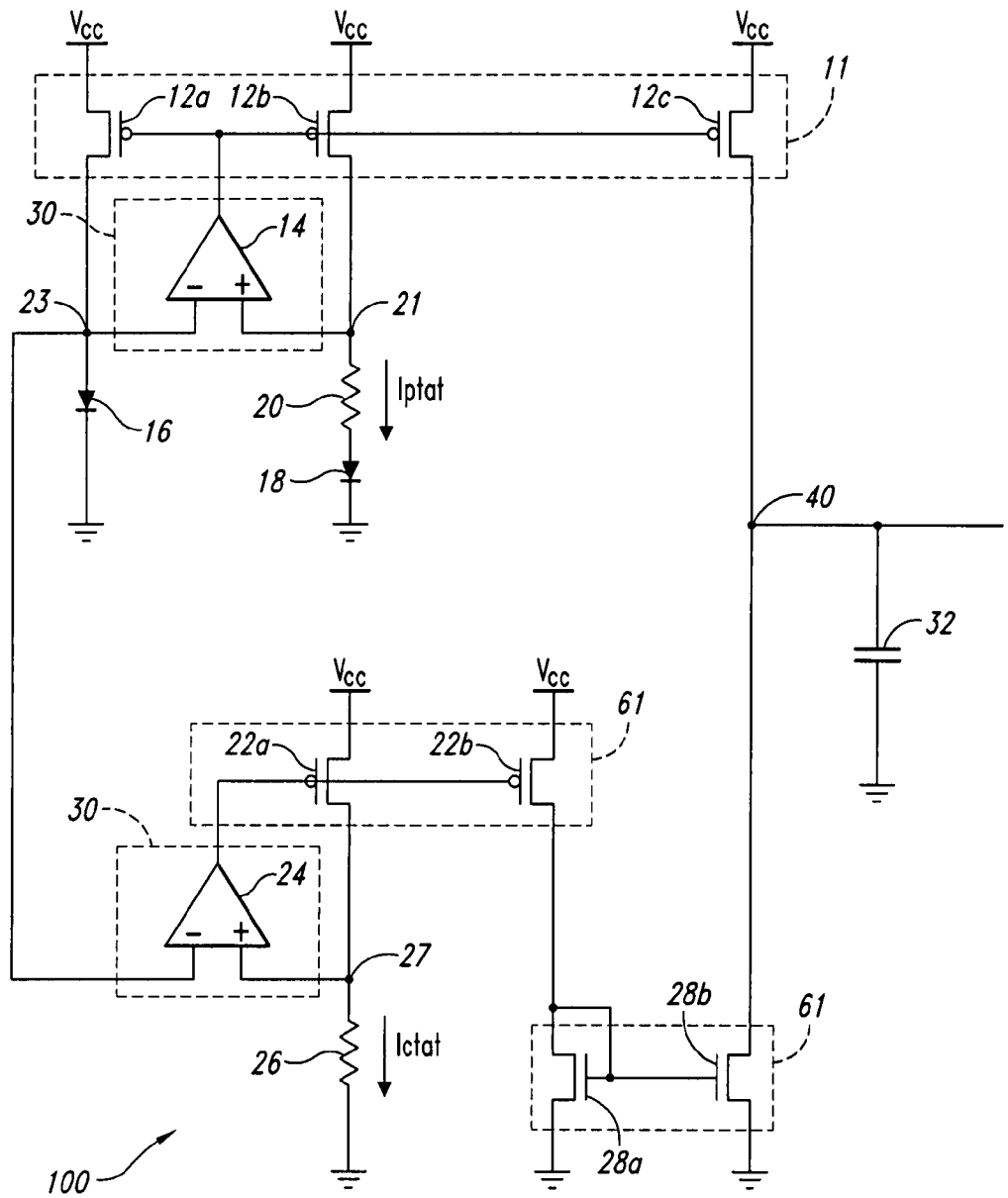
FIG. 1 is a schematic diagram of a prior art digital temperature sensor.
Figure 5:
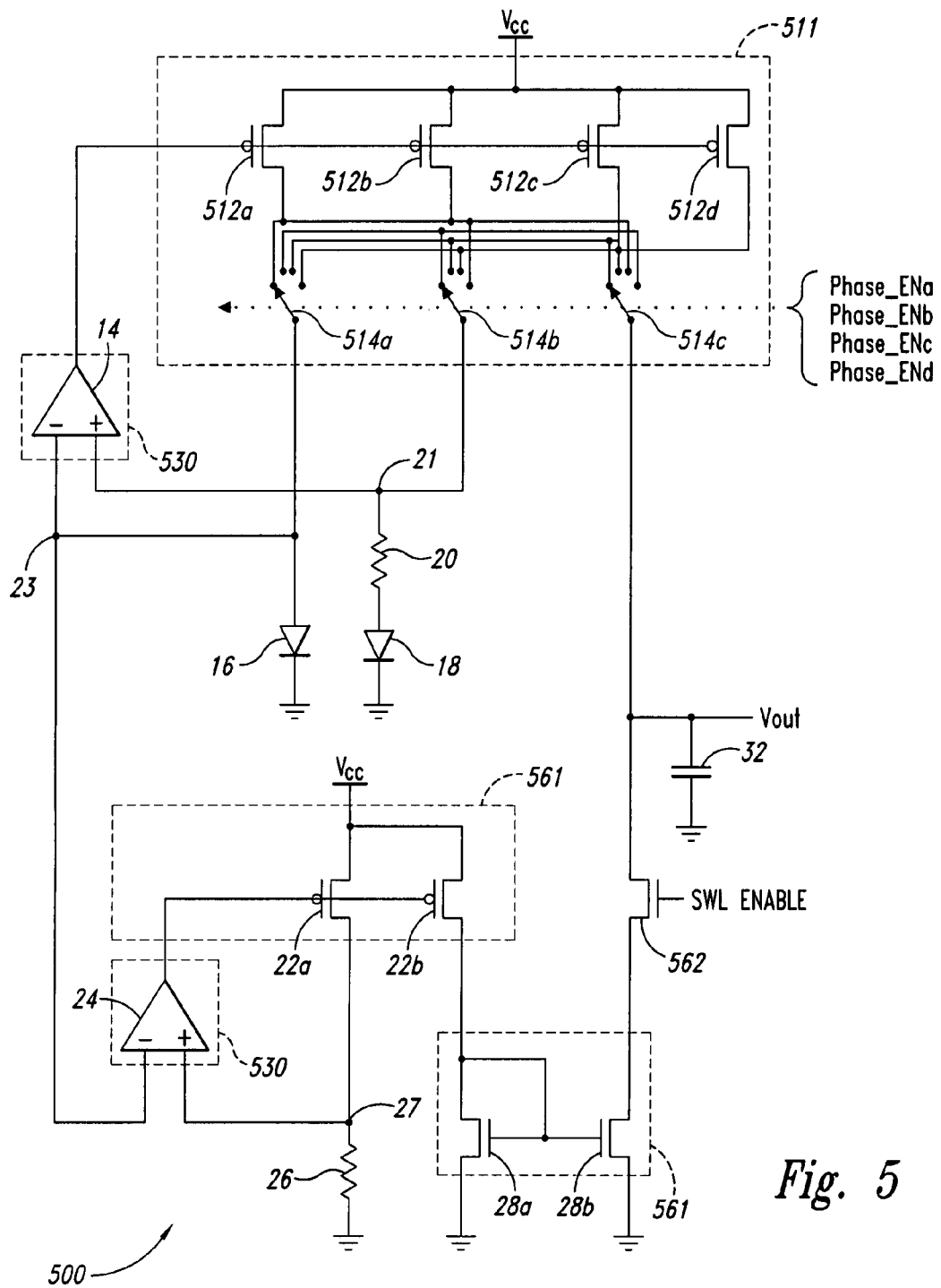
FIG. 5 is a schematic of a digital temperature sensor according to another embodiment of the invention.

FIG. 5 illustrates a temperature sensor circuit 500 according to an embodiment of the invention. The temperature sensor circuit 500 is similar to the temperature sensor 100 (FIG. 1), except that the temperature sensor 500 includes additional switching configurations for reducing device mismatch in a current mirror circuit 511 having multiple transistors. The temperature sensor 500 includes many of the same components as previously described with reference to the temperature sensor 100 of FIG. 1. As such, the same reference numbers used in FIG. 1 are used to refer to the same components in FIG. 5 where appropriate. Therefore, in the interest of brevity, an explanation of their structure and operation will not be repeated. The temperature sensor circuit 500 may include components 530 that include the differential amplifiers 14, 24 having a structure exemplified by the amplifier circuit 314 of FIG. 3. Similarly, the two-leg mirror configuration in circuit blocks 561 may have a structure that includes any of the switches 410-416 and is capable of receiving the PHASE_EN signals to switch the various terminals of the transistors 22, 28 during different phases of operation. However, referring back to FIG. 1, while the amplifiers 14, 24 and the current mirror transistors 44, 46 may be switched within two phases of operation, the transistors of current mirror 11 require more than two phases of operation to cancel the effect of offsets through averaging.

The current mirror 511 has a four-phase operation and can be substituted for the current mirror of block 11 (FIG. 1). Transistors 512a-d are controlled by the amplifier 14, and the drains of the transistors are coupled to switching circuits 514a-c each having four possible connecting nodes. Each node is coupled to one of the four transistors 512a-d. The switching circuits 514a-c in the current mirror circuit 511 is an example of reducing the effect of mismatched components for a circuit having multiple output terminals, such as shown the three output terminals of the current mirror 511. Each switching circuit 514a-c switches through the switch nodes responsive to one of four phase enable signals PHASE_ENa-d from the phase control circuit 265. The four phases of operation provides for the three outputs of the current mirror circuit 511 to be coupled to a different combination of three transistors for each phase, with the combination of transistors repeating after the fourth phase. For example, during a first phase, the switching circuits 514a-c couple transistors 512a-c to the three outputs. During a second phase, the switching circuits 514a-c couple transistors 512b-d to the three outputs. During a third phase, the switching circuits 514a-c couple transistors 514c, d, a to the three outputs, and during a fourth phase, couple transistors 514d, a, b to the three outputs. As will be described in more detail below, the four phase operation of the current mirror circuit 511 is particularly suited for use with the two phase operation of differential amplifier 314 (FIG. 3) and current mirror circuit 400 (FIG. 4).

Figure 6:
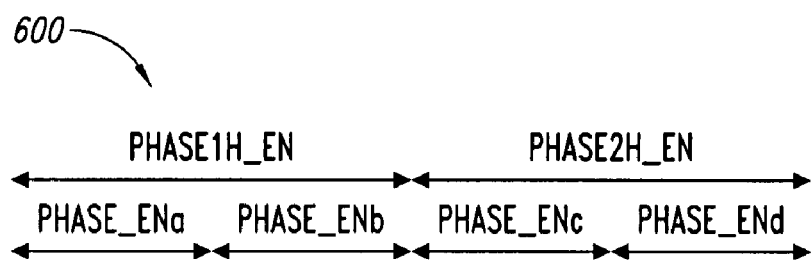
FIG. 6 is a diagram of the relative phase of signals received by the digital temperature sensor of FIG. 5.

The four-phase operation of the current mirror circuit 511 conveniently allows other circuitry in the temperature sensor circuit 500 to operate in two phases while the current mirror 511 is operated in four phases. For example, FIG. 6 shows how the timing of PHASE_EN signals generated by the phase control circuit 265 of FIG. 2 to allow the operation of blocks 530 and 561 in two phases and the current mirror circuit 511 in four phases. Two phase operation is in accordance with PHASE1H_EN and PHASE2H_EN signals, while four phase operation is in accordance with the PHASE_ENa, PHASE_ENb, PHASE_ENc and PHASE_ENd signals. In operation, the switching circuits 514a-c connect the first node to each of the respective signal paths responsive to the PHASE_ENa signal, and then switch connection of the signal paths to the second node responsive to the PHASE_ENb signal. During which time, the circuit blocks 530, 561 are configured for operation in a first phase responsive to the PHASE1H_EN signal provided by the phase control circuit 265. During a second phase of operation for circuit blocks 530, 561 responsive to the PHASE2H_EN signal, the switching circuits 514a-c switch coupling of the outputs of the current mirror 511 during the third and fourth phases responsive to the PHASE_ENc and PHASE_ENd signals. As illustrated by FIG. 6, the duration of the first phase of the blocks 520, 561 is twice as long as for the first and second phases for the current mirror 511. Assuming each of the four phases for the current mirror circuit 511 are N clock cycles, the phases for the blocks 520, 561 are 2N clock cycles. During operation, the currents through the transistors in the blocks 511, 530, 561 are sampled for N clock cycles. During the first phase while the three output terminals are coupled to the first node in accordance to the PHASE_ENa signal, the temperature measured by the temperature sensor circuit 500 is sampled for N clock cycles. The phase control circuit 265 then provides the next phase enable signal PHASE_ENb, to cause the switching circuits 514a-c to switch to the second connector node, so that the current mirror 511 provides output currents through transistors 512b-d. The temperature measured by the temperature sensor circuit 500 is sampled for an additional N clock cycles. In the meanwhile, the switch configurations in the circuit blocks 530, 561 remain the same for the first and second N clock cycles. The phase control circuit 265 generates the third phase enable signal PHASE_ENc to switch the switching circuits 514a-c to the third connector node to provide current through the transistors 512c, d, a and have the measured temperature sampled over a third period of N clock cycles. The PHASE_EN2 signal is also provided to the blocks 530, 561, to enable the second phase operation in the blocks 530, 561. The fourth phase of the current mirror circuit 511 occurs in response to the PHASE_ENd signal, while the blocks 530, 561 remain in the second phase. Current is output by the current mirror 511 through the transistors 512d, a, b and the measured temperature is sampled for a fourth period of N clock cycles. The sampled temperature over the 4N clock cycles is averaged to obtain final temperature data.

It will be appreciated that although the described embodiments apply to four transistors 512a-d in the current mirror 511 and an operation of temperature sensors 200, 500 that includes a combination of two and four phases, embodiments of the present invention can also be used for other numbers of components and timing combinations as well, where applicable, without departing from the scope of the present invention. Those ordinarily skilled in the art will obtain sufficient understanding from the description provided herein to make such modifications as needed to practice embodiments of the present invention as applied to the other numbers of circuit components and timing combinations. It will be further appreciated that the specific number of circuit components and types of components used in the temperature sensors 200, 500 are not intended to limit the invention to such particular embodiments. Those ordinarily skilled in the art will appreciate that the number of circuit components, types of components, and number of signal paths are details that can be modified without departing from the scope of the present invention.

Operation of the temperature sensor circuit 500 according to an embodiment of the invention is summarized by a flow diagram 700 of FIG. 7. As previously described, the temperature sensor circuit 500 provides a voltage representing a measured temperature. The voltage is sampled for N clock cycles and converted to digital signals. The total number of clock cycles and the results of the sampled data are tracked by one or more counters, such as the counters 244, 246 of FIG. 2. The flow diagram 700, therefore, includes as a first step 610 to sample the temperature for a period of N clock cycles, where N is greater than 1. Following the N clock cycles, switching circuits of the temperature sensor circuit 500 are switched, as previously described, and the measured temperature in the second circuit configuration is sampled for another period of N clock cycles. Sampling of the measured temperature for a period of N clock cycles is repeated for M times, as indicated as a step 620, where respective switching circuits are switched following N clock cycles. As a result, the temperature is sampled N clock cycles for M periods. The total sampled data is then averaged by the M periods, as shown at step 630, to generate an averaged final output for N clock cycles at step 640. It will be appreciated that the N value may be varied to increase or decrease the phase time. For example, assuming N=256 clock cycles, which is conventionally the number of clock cycles utilized in the temperature sensors 200, 500, the four phases of operation yields 4*256, which can be divided by 4 to calculate a final averaged result for 256 clock cycles. Alternatively, however, N may be assigned to 64 clock cycles instead of 256 clock cycles. In this case, the final result may be calculated by summing the results of four phases instead of averaging the total results, thereby generating a final result for 256 clock cycles. By changing the N number of clock cycles, the phase time for each operation may be increased or decreased.

Additionally, the total clock cycles may be averaged using a number of binary techniques known in the art, such as, for example, average the sampled temperature data from a two-phase operation by dropping the least significant bit in the binary count of the total measurements. Similarly, the sampled temperature data from a four-phase operation can be averaged by dropping the two least significant bits, and so forth. It will be appreciated that although the described embodiments are with respect to averaging the total sampled data using a counter, other circuitry or methods may be utilized for the final result calculations, such as utilizing an adder in the case of sampling for a reduced number of clock cycles, as previously described. Those ordinarily skilled in the art will obtain sufficient understanding from the description provided herein to make such modifications as needed to practice embodiments of the present invention.

FIG. 8 is a functional block diagram of a memory device 800 having drivers that include the output driver circuits in accordance with the embodiments previously described. The memory device 800 in FIG. 8 includes a synchronous dynamic random access memory ("SDRAM") or a reduced latency dynamic random access memory (RLDRAM), although the principles described herein are applicable to any memory device that may include a temperature sensor 880 according to embodiments of the invention.

The memory device 800 includes a memory array 830 of memory cells arranged in rows and columns. The memory array 830 may be accessed on a row-by-row, page-by-page or bank-by-bank basis as will be appreciated by one skilled in the art. The memory array 830 further includes a command, address and write data buffer block 828 that may receive row, column, and memory address signals over a bus 834 from some processing component (not shown) or controller (not shown), such as a memory controller. Similarly, read data signals may be received by read data buffers 824 to output read data from the memory array 830 through the bus 834. The block 828 may apply row address signals to a row decoder 860 and column address signals to a column decoder 870. The row decoder 160 activates a row of cells in the memory array 830 corresponding to decoded row address signals. Similarly, the column decoder 870 enables write data signals to be applied to selected columns corresponding to the column address signals and allows read data signals to be coupled from selected columns corresponding to the column address signals during memory read operation. The block 828 may additionally provide control and timing signals to various components of the memory device 800 for a number of performance operations. The detailed operation for generating control and timing signals is conventional, and thus, for the sake of brevity, will not be described in more detail.

Figure 9:
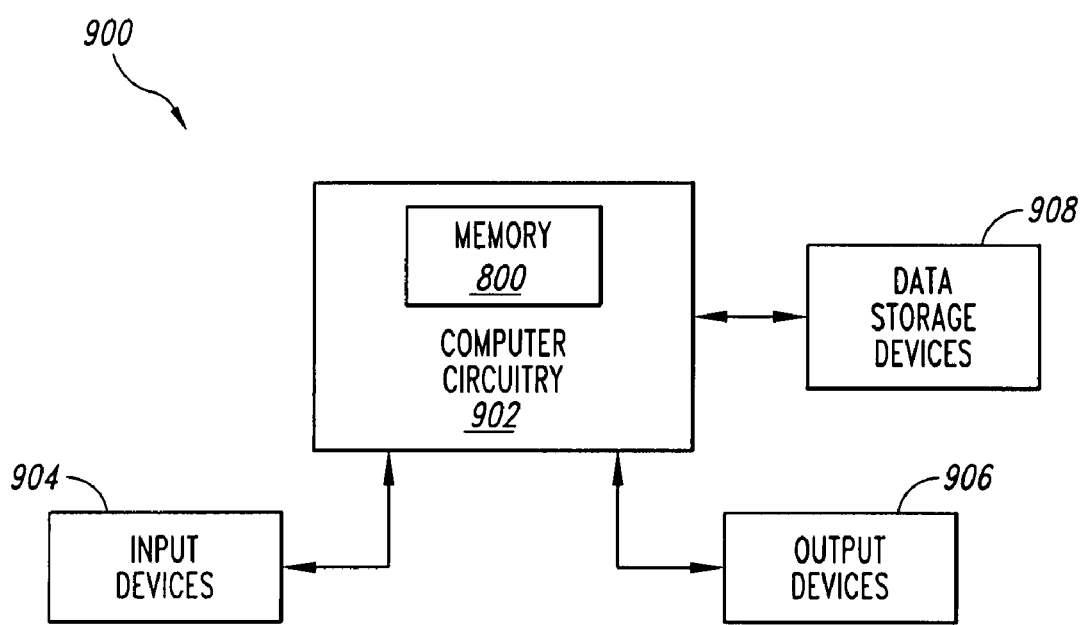
FIG. 9 is a functional block diagram illustrating a computer system including the memory device of FIG. 5.

FIG. 9 is a circuit diagram of an embodiment of a processor-based system 800 that includes the memory device 800 of FIG. 8. Conventionally, the processor circuitry 902 is coupled through address, data, and control buses to a memory device 910 to provide for writing data to and reading data from the memory device 910. The processor circuitry 902 includes circuitry for performing various processor functions, such as executing specific software to perform specific calculations or tasks. In addition, the processor-based system 900 may include one or more input devices 904, such as a keyboard or a mouse, coupled to the processor circuitry 902 to allow a user to interface with the processor-based system 900. Conventionally, the processor-based system 900 may also include one or more output devices 906 coupled to the processor circuitry 902, such as output devices conventionally including a printer and a video terminal. One or more data storage devices 908 are also conventionally coupled to the processor-based circuitry 902 to store data or retrieve data from external storage media (not shown). Examples of conventional storage devices 908 include hard and floppy disks, tape cassettes, compact disk read-only ("CD-ROMs") and compact disk read-write ("CD-RW") memories, and digital video disks ("DVDs"). Data storage devices 908 may also include non-volatile memory devices to store data that is to be retained even when power is not supplied to the processor-based system 900 or the data storage devices 908, such as a flash memory device (not shown) according to some other examples of the invention.

FIG. 9 may, for example, be a consumer device, such as a cell phone, digital camera or other hand-held device, having a user input 912 coupled to the processor 902. The processor 902 may be a microprocessor, digital signal processor, or part of a central processing unit that communicates with the user input 912 over a bus. The processor 902 may additionally have a random access memory (RAM) or, alternatively, the user input 912 may include the RAM to which the processor communicates over the bus. The user input 912 may additionally include a non-volatile storage device such as flash memory, or rely on the data storage device 908.

From the foregoing it will be appreciated that, although specific embodiments of the invention have been described herein for purposes of illustration, various modifications may be made without deviating from the spirit and scope of the invention. Accordingly, embodiments of the invention are not limited except as by the appended claims.

What is claimed is:

1. A temperature dependent circuit comprising:
a first current generator block configured to receive a temperature dependent signal and operable to generate a first signal based on the temperature dependent signal, the first current generator block having circuits configured to switch the configuration of the first current generator block between first and second configurations in response to a first control signal;
a second current generator block, configured to receive the temperature dependent signal and operable to generate a second signal inversely proportional to the first signal based on the temperature dependent signal, the second current generator block having circuits configured to switch the configuration of the second current generator block between first and second configurations in response to a second control signal;
a phase control circuit coupled to receive a clock signal and coupled to the first and second current generator blocks, the phase control circuit operable to generate the first and second control signals to switch the first and second current generator blocks between the respective first and second configurations after a time period; and
an analog-to-digital converter (ADC) circuit coupled to the first and second current generator blocks and the phase control circuit, the ADC circuit configured to convert the first and second signals into digital temperature data and further configured to average digital temperature data for a plurality of time periods.

2. The temperature dependent circuit of claim 1 wherein the first and second current generator blocks each comprise an amplifier coupled to drive at least two transistors coupled together in a current mirror configuration.

3. The temperature dependent circuit of claim 2 wherein the first and second control signals generated by the phase control circuit each controls the switching of input terminals and the switching of output terminals of the at least two transistors after the time period.

4. The temperature dependent circuit of claim 3 wherein the first and second control signals generated by the phase control circuit each controls the switching of the input and output terminals of each of the amplifiers after the time period.

5. The temperature dependent circuit of claim 1 wherein the first signal based on the temperature dependent signal is proportional to absolute temperature and the second signal that is inversely proportional to the first signal is complementary to absolute temperature.

6. The temperature dependent circuit of claim 5 wherein the first signal based on the temperature dependent signal charges a capacitor and the second signal that is inversely proportional to the first signal discharges the capacitor responsive to the ADC circuit comparing the stored value of the capacitor to a reference value.

7. The temperature dependent circuit of claim 6 wherein the ADC circuit comprises a counter circuit, the ADC circuit further operable to output a digital signal from the counter to provide a temperature readout value.

8. A temperature sensor comprising:
a first current mirror circuit having a plurality of transistors and configured to provide a first current proportional to a temperature;
a second current mirror circuit having a plurality of transistors and configured to provide a second current inversely proportional to the temperature;
a first amplifier circuit coupled to the first current mirror circuit and configured to receive a first input signal and a second input signal and operable to provide a first output signal and at least a second output signal through respective transistors in the first current mirror circuit responsive to the first and second input signals;
a second amplifier circuit coupled to the second current mirror circuit and configured to receive the first input signal and a third input signal and operable to provide at least a third output signal through a respective transistor in the second current mirror circuit responsive to the first and third input signals;
a first group of switching connectors coupled to the first current mirror circuit and configurable to receive a control signal, the first group of switching connectors operable to switch the connection of the plurality of transistors in the first current mirror circuit and at least two signal paths between first and second configurations responsive to the control signal; and
a temperature data conversion circuit coupled to the first and second current mirror circuits and configured to provide digital temperature data based at least in part on the first and second output signals from the first and second current mirror circuits, respectively, the temperature data conversion circuit further configured to average the digital temperature data from the first and second configurations.

9. The temperature sensor of claim 8 wherein the plurality of transistors in the first current mirror circuit comprise four transistors and the first group of switching connectors comprise three switches coupled to three signal paths, each of the three switches configurable to couple its respective signal path to one of the four transistors.

10. The temperature sensor of claim 9 further comprising a second group of switching connectors coupled to the second current mirror circuit, wherein the plurality of transistors in the second current mirror circuit comprise two transistors and the second group of switching connectors comprise two switches coupled to two signal paths, each of the two switches configurable to couple its respective signal path to one of the two transistors.

11. The temperature sensor of claim 10 wherein the control signal comprises four phase enable signals, each of the four phase enable signals configurable to enable each of the switches in the first group of switching connectors in four phases of operation, the four phase enable signals further configurable to be arranged into two phases operation to enable each of the switches in the second group of switching connectors in the two phases of operation.

12. The temperature sensor of claim 11 wherein each of the amplifier circuits comprise a third group of switches, the third group of switches comprising a pair of switches coupled to the input terminals and a pair of switches coupled to the output terminals of each of the amplifiers, the third group of switches operable to flip the input and output terminals responsive to the phase enable signals arranged in two phases of operation.

13. The temperature sensor of claim 8 wherein the output signals of the first current mirror circuit is proportional to absolute temperature and the at least third output signal is complementary to absolute temperature.

14. The temperature sensor of claim 13 further comprising a sampling circuit having a counter circuit, the sampling circuit further operable to output a plurality of digital signals after sampling the output signals of the first and second current mirrors, and storing the plurality of digital signals in a counter to convert the stored digital signals to a temperature readout value.

15. A memory device comprising:
an array of memory cells; and
a temperature sensor, the temperature sensor comprising:
a first amplifier circuit coupled to a first current mirror circuit, the first amplifier circuit operable to source a first output signal and at least a second output signal through at least two respective transistor in the first current mirror circuit, the first and second output signals increasing in magnitude in response to increasing temperature;
a second amplifier circuit coupled to a second current mirror circuit, the second amplifier circuit operable to sink at least a third output signal through a respective transistor in the second current mirror circuit, the third output signal decreasing in magnitude in response to decreasing temperature; and
a first group of switching connectors coupled to the first current mirror circuit and configurable to receive a control signal, the first group of switching connectors operable to switch the connection between the at least two respective transistors in the first current mirror circuit and at least two signal paths responsive to the control signal; and
a temperature data conversion circuit configured to generate temperature data based at least in part on the first, second, and third output signals and average the temperature data from the first current mirror circuit for the two signal paths.

16. The memory device of claim 15 wherein
the at least two transistors in the first current mirror circuit comprise four transistors and the first group of switching connectors comprise three switches coupled to three signal paths, each of the three switches configurable to couple its respective signal path to one of the four transistors; and
the second current mirror circuit is further coupled to a second group of switching connectors, the second current mirror circuit further comprising another transistor and the second group of switching connectors comprise two switches coupled to two signal paths, each of the two switches configurable to couple its respective signal path to one of the two transistors.

17. The memory device of claim 16 wherein the control signal comprises four phase enable signals, each of the four phase enable signals configurable to enable each of the switches in the first group of switching connectors in four phases of operation, the four phase enable signals further configurable to be arranged into two phases operation to enable each of the switches in the second group of switching connectors in the two phases of operation.

18. A method of sensing changes in temperature and generating a digital output, the method comprising:
receiving at least one input signal, the at least one input signal being temperature dependent;
sourcing a first output signal and at least a second output signal through at least two signal paths responsive to receiving the at least one input signal, the first and second output signals proportional to absolute temperature;
sinking at least a third output signal through at least one signal path responsive to receiving the at least one input signal and a sink enable signal, the third output signal complementary to absolute temperature;
flipping the connection between the first output signal and the at least second output signal through the at least two signal paths; and
generating temperature data based at least in part on first, second, and third output signals and averaging the temperature data resulting from the two connections between the first and second output signals through the at least two signal paths.

* * * * *